United States Patent [19]

Allain et al.

[11] 3,928,443

[45] Dec. 23, 1975

[54] COPPER CATALYST AND PROCESSES FOR MAKING AND USING

[75] Inventors: Ronald J. Allain, Brookhaven, Miss.; Virgil L. Seale, Houston, Tex.

[73] Assignee: Nalco Chemical Company, Oak Brook, Ill.

[22] Filed: Sept. 20, 1974

[21] Appl. No.: 507,818

[52] U.S. Cl.......... 260/561 N; 252/476; 252/477 Q; 260/557 R; 260/558 R
[51] Int. Cl.²...................................... C07C 103/08
[58] Field of Search........ 260/557 R, 558 R, 561 N; 252/463, 476, 477 Q

[56] References Cited
UNITED STATES PATENTS

| | | | |
|---|---|---|---|
| 3,767,706 | 10/1973 | Habermann et al. | 260/561 N |
| 3,809,658 | 5/1974 | Csuros et al. | 252/477 Q |

FOREIGN PATENTS OR APPLICATIONS

| | | | |
|---|---|---|---|
| 44-8987 | 4/1967 | Japan | |
| 44-8988 | 4/1969 | Japan | 252/477 Q |
| 44-9459 | 5/1969 | Japan | 252/477 Q |
| 2,240,783 | 2/1973 | Germany | |

*Primary Examiner*—C. Davis
*Attorney, Agent, or Firm*—Hill, Gross, Simpson, Van Santen, Steadman, Chiara & Simpson

[57] ABSTRACT

A copper catalyst prepared by first contacting particulate copper/aluminum alloy particles with an aqueous solution containing therein hydrochloric and/or sulphuric acid and then secondly by contacting the resulting particles with an aqueous solution containing, for example, alkali metal hydroxide, amine base, etc. Preferably, during such second contacting there is present in such solution an additive such as hydroxyl containing hydrocarbon compound, amino acid, etc. The invention further relates to an improved process for making acrylamide from a composition of acrylonitrile and water utilizing the copper catalyst so made.

9 Claims, No Drawings

COPPER CATALYST AND PROCESSES FOR MAKING AND USING

BACKGROUND OF THE INVENTION

In the art of catalytically hydrolyzing nitriles, such as acrylonitrile with water to acrylamide, various copper and copper containing catalysts have been proposed, such as mixtures of copper oxide with other metal oxides, reduced copper oxide/metal oxide mixtures, copper and copper/metal mixtures (see U.S. Pats. Nos. 3,597,481; 3,631,104; 3,642,894; and 3,642,643). The use of Raney copper catalysts for this purpose is shown in German Patent No. 2,036,126, German DOS 2,164,185 (1972), and Canadian Patent No. 839,384 (1972). Based upon the method of catalyst preparation, it would appear that such prior art can be cataloged into two groups, one group involving the reduction of a copper containing compound or compounds, the other group involving the caustic activation of a copper or copper alloy (such as Raney copper).

So far as can be determined, when using a Raney copper catalyst to hydrolyze acrylonitrile to acrylamide by the teachings of the prior art, it has been the practice to prepare or activate such catalyst by contacting such in a particulated form with aqueous caustic or amine base to dissolve away at least a portion of the aluminum after which the resulting activated product is kept under water or inert solvents to avoid oxidation. Apparently, no one has ever heretofore prepared a copper catalyst by so pre-treating particulated copper aluminum alloy with an acid and then contacting the resulting particles with water or aqueous base. Furthermore, apparently no one has ever heretofore used a catalyst so prepared to convert olefinic nitriles to amides under aqueous liquid phase conditions.

Because of the limitations and short-comings observed for prior art copper catalysts, the art continues to seek a Raney copper catalyst adapted for use in such hydrolysis reactions.

BRIEF SUMMARY OF THE INVENTION

In one aspect, the present invention relates to a process for making a copper catalyst. This catalyst is made by the steps of firstly contacting particles of a metal alloy comprised of copper and aluminum in a weight ratio from about 70:30 to 30:70 copper to aluminum. These particles range in size from about 0.001 to 0.5 inch. The contacting is done with a first aqueous solution which has dissolved therein on a one hundred weight percent total by-product free solution basis from greater than 0 to about 50 weight percent of at least one mineral acid selected from the group consisting of sulphuric acid and hydrochloric acid. The contacting is conducted for a time sufficient to remove from said particles at least about 5 weight percent of the aluminum initially present therein. Secondly one contacts the so acid-treated particles with a second aqueous solution which has dissolved therein on a one hundred weight percent total byproduct free solution basis from greater than 0 to about 50 weight percent of at least one material selected from the group consisting of alkali metal hydroxide, ammonium hydroxide, aliphatic amine, quaternary ammonium hydroxide, alkali metal carbonate and water having a pH ranging from about 5.5 to 7.5. The contacting is conducted for a time sufficient to remove from said so acid-treated particles at least 1 weight percent aluminum, based on total weight of aluminum initially present in said particles. The invention includes the catalyst so made.

In another aspect, the present invention relates to a process for hydrolyzing an olefinic nitrile containing from 3 through 6 carbon atoms per molecule to the corresponding amide. This process comprises the steps of firstly making the catalyst as above indicated. Then one washes the resulting product catalyst particles with water having a pH ranging from about 5.5 to 7.5 for a time at least sufficient to cause said wash water to have a pH ranging from about 5.5 to 7.5 and sufficient to remove from such product particles any non-metallic visible solids. Finally, one contacts the so-washed catalyst particles with a composition comprising from about 10 to 75 weight percent acrylonitrile with the remainder up to one hundred weight percent thereof being water at a temperature ranging from about 60° to 150°C for a time sufficient to convert at least some of said olefinic nitrile to the corresponding amide.

The present invention thus has as a primary object the provision of an improved copper catalyst and a technique for making same.

As another primary object, the present invention aims to provide an improved process for hydrolyzing an olefinic nitrile, such as acrylonitrile, to the corresponding amide, such as acrylamide, using an improved catalyst under aqueous liquid phase elevated temperature hydrolysis conditions.

Other and further aims, objects, purposes, advantages, utilities, and features will be apparent to those skilled in the art from a reading of the present specification.

DETAILED DESCRIPTION

In preparing a catalyst by the teachings of the present invention it is preferred to employ as the starting acid solution one which contains from about 5 to 30 weight percent of hydrochloric acid and/or sulphuric acid. A sulphuric acid solution is presently preferred as a starting acid solution.

The starting preformed binary metal alloy comprised of copper and aluminum in particulate form preferably has a weight ratio of copper to aluminum ranging from about 45:55 to 55:45, and most preferably about 50:50.

When the starting alloy particles are treated with the starting acid solution, at least about 5 weight percent of the aluminum initially present in the particles (one hundred weight percent basis) is removed. The amount of acid present in the solution is at least equal to the stoichiometric amount of aluminum which is desired to be removed from the starting alloy particles, although preferably a large excess of acid is present, such as a quantity of acid which is at least equal to about 10 or even 20 moles of the total amount of aluminum sought to be removed. Preferably the amount of aluminum removed by acid solution contacting ranges from about 10 to 30 weight percent of the total quantity of aluminum initially present in the starting alloy particles.

During the time when copper aluminum alloy particles are being contacted with an acid solution it is desirable to maintain the acid solution at a temperature below about 80°C and preferably between about 75°C and 40°C, since the temperature of the particles during acid contacting is believed to have an influence on the catalytic activity of the product catalyst particles made in accordance with the teachings of the present invention. The lower limit of temperature during such acid contacting is unimportant except that the temperature should be, for practicel purposes, at least sufficient to produce a visible evolution of hydrogen bubbles from the region of the particles during such acid contacting in order to achieve the desired loss of aluminum through acid contacting within a finite time period.

If the temperature employed in any given contacting operation is sufficiently high or if the particular type of acid solution used for acid contacting is such that a large volume of hydrogen gas is evolved per unit of time, there is a possibility for foaming to occur, in which event the acid-treating reaction can become difficult to control and the possibility of undesirable loss of particles can occur. Therefore it is desired to conduct the acid contacting operation at temperatures where foaming does not occur. The temperature of foaming is a highly variable thing depending upon acid concentration and acid composition employed as well as other variables, so that it is not possible to give a hard indication as to the temperature where foaming will occur in all instances in the practice of the present invention.

When a solution of sulphuric acid or hydrochloric acid is used for acid treatment, it is usually preferable to warm the solution, since at room temperatures the evolution of hydrogen is characteristically very low. Thus with sulphuric acid or hydrochloric solutions temperatures in the range of from about 50° to 90°C can be employed.

It is an unusual feature of the present invention that the rate of hydrogen evolution from a particulate copper aluminum alloy being acid treated in accordance with the teachings of the present invention can be very substantially accelerated by admixing even minor amounts of hydrochloric acid solution with a sulphuric acid solution being used to contact starting particles or vice versa. Thus, a weight ratio of as low as about 0.1:100 hydrochloric acid to sulphuric acid or a weight ratio of as low as about 0.1:100 sulphuric acid to hydrochloric acid is sufficient to increase very substantially the rate of hydrogen evolution from the copper aluminum alloy particles even at ambient temperatures or below. For example, one presently preferred procedure is to employ a starting composition containing copper aluminum alloy starting particles immersed in a solution of from about 15 to 30 weight percent sulphuric acid with the volume of such sulphuric acid solution to volume of acid particles being at least about 50:1 acid to particles. Then to this solution one adds two or three drops of a 15 to 30 weight percent aqueous hydrochloric acid solution, all solutions being at ambient temperature conditions. Strong hydrogen evolution from the copper aluminum particles immediately commences.

Thus it is convenient to employ a weight ratio of hydrochloric to sulphuric acid in the range from about 0.05:100 to 2:100 using respective acid solutions having a concentration in the range from about 15 to 30 weight percent. A similar weight ratio of sulphuric acid to hydrochloric acid can be employed when one uses a solution of hydrochloric acid as the starting solution in place of sulphuric acid solution. In general it is preferred to use sulphuric acid as a starting acid solution because in some applications it is believed that chloride ions can exert an adverse influence upon product catalyst activity.

A similar acceleration of the rate of hydrogen evolution may be achieved by adding a small amount of nitric acid solution to a starting solution of hydrochloric acid or sulphuric acid, alternatively, either having a strength from about 15 to 30 weight percent, the nitric acid being in the form of an aqueous solution itself having a concentration from about 15 to 30 weight percent. The use of a nitric acid solution itself as an acid-treating medium in accordance with the teachings of the present, and even as a hydrogen evolution promoter through admixture with a sulphuric acid or hydrochloric acid solution, is generally not preferred in the practice of the present invention, since nitric acid functions to dissolve copper in a copper aluminum alloy and such a copper dissolution tends to reduce the quantity of copper catalyst finally produced. However addition of a few drops of nitric acid to a hydrochloric acid or sulphuric acid solution employed in large excess minimizes the amount of copper dissolved from particles undergoing acid treatment. In general it is convenient to employ a weight ratio of nitric acid to hydrochloric acid and/or sulphuric acid ranging from about 0.01:100 to 2:100, although somewhat smaller and larger quantities may be employed if desired.

Such an acid treatment of copper aluminum alloy particles functions, among other things, to foraminate the starting particles which increases the surface area thereof and which is usually desirable in a product catalyst, as those skilled in the art will appreciate. It is because of this foramination effect that in some instances it is desirable to use a small amount of nitric acid, as indicated above, in the acid treatment of copper aluminum alloy particles in the preparation of a catalyst in accord with the teachings of the present invention.

In general, the time for contacting particles with an acid solution by the teachings of the present invention is dependent upon a number of process variables, particularly upon the quantity of aluminum leached or desired to be leached away through acid contact and the speed at which such aluminum removal is achieved or achievable. For reasons of process convenience it is preferred to employ an acid-contacting time ranging from about 2 to 72 hours, though as those skilled in the art will appreciate, longer and shorter times may be employed without departing from the spirit and scope of the present invention.

The particular manner in which acid contacting is achieved is simply a manner of convenience. Thus the starting alloy particles may be simply immersed into a solution of acid. Alternatively, a solution may be circulated over and through a batch of particles maintained more or less in a fixed position. A quantity of fresh acid solution may be continuously added into a reaction zone containing acid solution and alloy particles, and the aqueous medium resulting from contact with particles may be continuously removed, if desired, from the region of acid/particle contact.

It is preferred to use deionized or distilled water for acid treatment. Also, it is preferred to avoid any oxygen exposure to the particles undergoing treatment so that it is preferred to maintain the starting particles and the particles undergoing treatment out of contact with air. Use of deoxygenated water is also desirable to minimize oxygen contact.

After an acid treatment step is completed, it is preferred to wash the resulting acid-treated particles with water (preferably deionized or distilled) having a pH in the range from about 5.5 to 7.5 until the wash water itself has a pH in the range from about 5.5 to 7.5. Washing may be accomplished using any conventional procedure.

After undergoing acid contacting as herein taught, the resulting copper aluminum alloy particles are contacted with an aqueous solution of at least one material selected from the group consisting of alkali metal hydroxide, ammonium hydroxide, aliphatic amine, quaternary ammonium hydroxide, alkali metal carbonate and water having a pH ranging from about 5.5 to 7.5, as indicated above. Alkali metal hydroxide is preferred, and among the alkali metal hydroxides sodium hydroxide is preferred. Preferably, when alkali metal hydroxide, ammonium hydroxide, aliphatic amine, quaternary ammonium hydroxide or alkali metal carbonate is employed, the solution strength ranges from about greater than 0 to 30 weight percent of such dissolved material, and more preferably such a solution comprises from about 0.01 to 10 weight percent thereof.

This time of contacting, in general, is at least sufficient to remove from the particles at least about 1 weight percent aluminum based on a total initial weight of aluminum present in the starting particles before acid treatment, and preferably at least about 5 weight percent aluminum, same basis, is removed, assuming that the acid-treated particles yet retain such an amount of aluminum.

Commonly and preferably a catalyst prepared in accordance with this invention after treatment with such a base solution or water, as indicated, comprises from about 2 to 45 weight percent aluminum with the balance up to 100 weight percent thereof being copper, and more preferably, such catalyst comprises, on a 100 weight percent total weight basis, from about 10 to 35 weight percent aluminum with the balance up to 100 weight percent thereof being copper. This catalyst is in the form of particles whose average diameters typically range from about 0.001 to 0.5 inch.

With certain types of solution a vigorous rate of reaction between the particles and solution can occur, as demonstrated by the rate of hydrogen evolution. For example, alkali metal hydroxide at solution strengths from about 5 to 30 weight percent can cause a vigorous reaction to occur even at ambient temperatures. Preferably, the contacting between particles and solutions is conducted so that the temperature of the aqueous medium in the vicinity of the particles being contacted does not rise above about 75°C, as herein elsewhere indicated.

Preferably, there is sufficient aluminum present in the alloy particles being so treated with a base in accordance with this invention that at least about 20 weight percent of the aluminum initially present in the alloy on a 100 weight percent total initial alloy basis is removed.

When using alkali metal hydroxide, ammonium hydroxide, aliphatic amine, quaternary ammonium hydroxide, or alkali metal carbonate, the total number of moles charged to the reaction medium during the total time of contacting is at least about 0.5 times the number of moles of aluminum initially present in the alloy particles which have been acid treated. The total weight of water initially present in this medium during the second contacting at the beginning thereof plus any water added during the course of such second contacting preferably ranges from about 100 to 1.5 times the total weight of alkali metal hydroxide, ammonium hydroxide, aliphatic amine, quaternary ammonium hydroxide and/or alkali metal carbonate charged to the medium.

Thus in one mode of operating, an acid-treated alloy is brought into prolonged contacting timewise with an aqueous solution of alkali metal hydroxide. Such alkali metal hydroxide solution so added can contain from about 1 to 40 weight percent dissolved hydroxide, preferably, though solutions of alkali metal hydroxide having higher caustic contents, even up to solution saturation, may be employed as starting leaching compositions for use in the practice of the present invention. Alkali metal hydroxide alternatively may be added as solid pellets or flakes (as can aliphatic amine or quaternary ammonium hydroxide or, although handling of solids in solution form is generally preferred on a commercial scale for reasons of safety and economy. During addition of such agents reaction occurs between the aluminum in the starting acid-treated alloy particles, so that aluminum is dissolved therefrom, as indicated. The amount of aluminum dissolved can vary greatly, and, particularly in the case of certain types of second contacting solutions, the amount of aluminum removed does not appear to be closely correlated with product catalyst properties.

Thus, for example, the activity of a catalyst prepared using alkali metal hydroxide during the second contacting appears to be about the same in some instances as a catalyst of the Raney copper type made with activation by using alkali metal hydroxide only without any acid pre-treatment in accordance with the teachings of this invention, the aluminum content of each of the product catalysts being approximately the same, and the aluminum content of the starting alloy particles being approximately the same.

Particularly in the case of a second solution used in second contacting having a weakly basic character, such as one made using ammonium hydroxide, certain amines, certain quaternary ammonium hydroxides, alkali metal carbonate, or water, it appears that a product catalyst can have a greater initial catalytic activity when prepared in accordance with the teachings of this invention than when one prepares a catalyst without using any acid treatment. Hence, in certain instances, the present invention affords a method for producing a copper catalyst which has a higher initial activity than was heretofore achieved by using the same basic copper aluminum starting materials, particularly when the product catalyst is to be used for the hydrolysis of a material such as acrylonitrile to acrylamide under aqueous liquid phase conditions. Thus, as the examples herein below provided demonstrate, acid pre-treatment followed by contacting with ammonium hydroxide solution or alkali metal carbonate solution can, for example, produce a copper catalyst having surprisingly high initial catalytic activity.

Certain types of second contacting solutions, e.g., solutions of ammonium hydroxide, aliphatic amine, quaternary ammonium hydroxide, alkali metal carbonate and water, can require appreciable contacting times in order to leach away the one percent of aluminum as desired in accordance with the general teachings of this invention, even when somewhat elevated temperatures are employed. By using an acid pre-treatment in accordance with the teachings of the present invention, it becomes possible and practical to prepare copper catalysts using such second contacting solutions in a practical manner, whereas if such solutions were used by themselves without acid pre-treatment the contacting times and overall catalyst preparation times become excessive and impractical. Hence the present invention provides a technique for accelerating the production of copper catalysts of the type which are base treated and which are usable in such reactions as the hydrolysis of, for example, acrylonitrile to acrylamide.

For reasons of practicality it is generally preferred to carry out a second contacting in accordance with the teachings of this invention within a total time interval ranging from about 2 to 30 hours, though longer and shorter times may be employed, such as times of up to even 200 hours or longer. In a preferred mode of second contacting, a fresh or starting basic solution, such as one containing alkali metal hydroxide or alkyl or alkanol amine dissolved therein, is added or contacted gradually to such acid-treated alloy particles. The acid-treated particles may be initially immersed in water before being brought into contact with the second contacting solution. The resulting aqueous medium to which the second contacting solution is added can typically contain from about 0.5 to 40 weight percent of a dissolved material, such as alkali metal hydroxide, ammonium hydroxide, aliphatic amine, quaternary ammonium hydroxide or alkali metal carbonate, and the starting solution can contain from about 1 to 50 weight percent, more or else, of such a material. The contact rate between second starting solution and group of acid-treated copper aluminum alloy particles can range during such a contacting from about 0.01 to 7.0 moles of second contacting solution per mole of aluminum initially present in the acid-treated alloy particles per hour.

When incremental addition is employed it will be appreciated that either continuous or discontinuous addition of solution may be involved, though continuous addition is preferred for reasons of production simplicity. In general the contact rate may be considered to be equivalent to the addition rate, if desired.

Preferably, the total quantity of dissolved solids in such a second contacting solution can range from about 0.5 to 20 moles of dissolved solids (alkali metal hydroxide, ammonium hydroxide, aliphatic amine, quaternary ammonium hydroxide, or alkali metal carbonate) per mole of aluminum initially present in the acid-treated particles. After all of a second contacting solution has been completely added to a reaction zone wherein the second contacting is taking place, the second contacting may be and preferably is continued on for a period of time. The basic solution used in a second contacting operation can conveniently employ a total quantity of, for example, alkali metal hydroxide, aliphatic amine, ammonium hydroxide and/or quaternary ammonium hydroxide, such that the total molar quantity used totals from about 1 to 5 times the total molar amount of aluminum it is desired to leach away, as when a batch preparation procedure is being employed where the aqueous second contacting solution is being added to a vessel containing a fixed quantity of acid-treated alloy, and such second contacting solution is allowed to accumulate in the vessel during the contacting operation. Alternatively, for example, one can employ a batch preparation procedure wherein the second contacting solution used is continuously removed from the region of the alloy particles being treated after contact therewith so that a fresh second contacting solution is continuously or intermittently brought into contact with alloy particles being processed in accordance with the teachings of this invention; in such a procedure one can employ a larger total excess quantity of starting leaching composition during the second contacting operation, as those skilled in the art will appreciate, than in a continuous preparation procedure.

During the contacting of an acid-contacted alloy with a second contacting solution in accord with this invention, an aluminate (in solution or dispersion) and hydrogen gas are produced. Conveniently, the hydrogen gas is vented more or less at a rate generated from the reaction zone, and most of the aluminate is removed in the water of the leaching composition (or second contacting solution).

Instead of using hydrogen evolution or contacting rate as a control means, one may employ temperature regulation as a primary means of controlling production of catalyst from a starting acid-treated alloy. When so using temperature control, those skilled in the art will appreciate that the second contacting solution may initially contain at least about 0.1 weight percent of dissolved material selected from the group consisting of alkali metal hydoxide, ammonium hydroxide, aliphatic amine and/or quaternary ammonium hydroxide and preferably about at least 10 weight percent thereof. The medium may be conveniently preliminarly cooled to a temperature which is not above 35°C and which is preferably not above about 20°C before being brought into contact with such a group of alloy particles. Optionally, substantially all of the second contacting solution can be initially present in a contacting medium and such medium is conveniently bulk added to a reaction zone wherein the acid-treated alloy particles are maintained and the bulk temperature is maintained below about 20°C during such contacting until preferably at least about 20 weight percent, and preferably at least about 25 weight percent of aluminum is removed (based on total initial alloy weight).

In catalyst activation using incremental addition of second contacting solution or low temperature, contacting is best achieved by maintaining the particles of acid-treated alloy in a substantially fixed reaction zone. The particles may be in a substantially fixed spatial position, or, if they are small enough, they may be suspended in the fixed reaction zone in the second contacting medium by means of agitation, medium circulation, or the like. Thus, a second contacting solution can be continuously agitated, or, when the particles are maintained in a relatively fixed spatial position, the medium can be circulated through and around such. It is preferred to avoid masses of alloy particles to minimize deleterious heat exposure thereof.

It is preferred to conduct the second contacting under a blanket of inert, non-oxidizing gas.

When using water having a pH ranging from about 5.5 to about 7.5 as the second contacting solution, the starting acid-treated alloy particles are maintained in contact with such water (which is preferably deionized or distilled) for a period of time which is at least sufficient to produce evolution of hydrogen gas, such as can be visually detected in the form of bubbles issuing from the particles while immersed in water. Preferably, the contacting with water is continued not only until hydrogen evolution is observed, but until, at a subsequent time, the starting alloy particles change color from their white or silvery appearance to a coppery color or dark color approaching black. More preferably, the contacting of particles with water is continued not only up to the time when such a color change is observable visually, but also for a period of time thereafter which is at least about 100 hours. Apparently, particles can be contacted with water for an indefinitely long period of time in the production of a catalyst in accord with the teachings of this invention, but periods of time longer than about two or three months are believed not to result in appreciably further enhancement of catalytic activity.

During contacting with water, in a second contacting step, the particles being treated may be contacted with circulating or noncirculating water. For example, the particles can be maintained in an enclosed area continuously during the entire period of contacting using the same water, or, alternatively, the particles during contacting can be exposed to water flowing over and through the particles. Such flowing water can be continuously reused, so that no fresh water need be introduced into the contacting system, or, alternatively, fresh water can be continuously added to the system, thereby replacing, optionally, in whole or in part, the water initially present in such a flowing water contacting system. Preferably, a large excess, from a volumetric or weight standpoint, of water relative to particles is employed during such a contacting operation. Thus, preferably, at least a 10-fold volumetric excess is employed, and more preferably, at least about a 100-fold volumetric excess of water is employed.

During second contacting atmospheric pressures are employed, though superatmospheric and subatmospheric pressures can also be used.

When contacting acid pre-treated particles with water having a pH in the range of from about 5.5 to about 7.5 using a batch-type contacting procedure, as the contacting progresses, the system appears to produce more or less as a byproduct light-colored, whitish or greyish white material which tends to be in a solid form and to be located in the vicinity of, and adjacent to, the metal particles themselves. Though there is no wish herein to be bound theory or unsubstantiated fact, it is theorized that such material may be insoluble aluminates.

Preferred nitrogen bases for use in this invention comprise ammonium hydroxides, alkyl amines, alkanol amines, and quaternary ammonium hydroxides. Preferred organic amine bases used in a second contacting operation in accord with the teachings of this invention comprise at least one compound selected from the group consisting of tri(lower alkyl) amines, tri(lower alkanol) amines, mono(lower alkyl) di(lower alkanol) amines, di(lower alkyl) mono (lower alkanol) amines, tetra(lower alkyl) quaternary ammonium hydroxides, tetra(lower alkanol) ammonium hydroxides, mono(lower alkyl) tri(lower alkanol) quaternary ammonium hydroxides, di(lower alkyl) di(lower alkanol) quaternary ammonium hydroxides and tri (lower alkyl) mono(lower alkanol) quaternary ammonium hydroxides. As used herein, the term "lower" has reference to less than six carbon atoms per group or molecule, as the case may be.

A suitable class of quaternary ammonium hydroxide compounds adapted for use in the present invention is characterized by the formula:

(1) 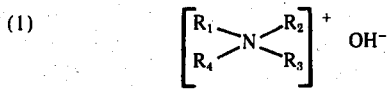

wherein: $R_1$, $R_2$, $R_3$, and $R_4$ are each a lower alkyl radical or a lower hydroxyalkyl radical.

When using an amine base, for example, the reaction rate between base and acid-treated particles is dependent upon many variables, such as amine base type, concentration, temperature, pressure, alloy particle size, alloy composition, and the like, as those skilled in the art will appreciate. Typically, a total quantity of amine base is used such that the molar quantity of amine base totals from about 0.25 to 2.0 times (preferably about 1.1 to 2.0 times) the total molar amount of aluminum initially present in a starting group of alloy particles, as when a batch preparation procedure is being employed where the aqueous amine base is being added to a vessel containing a fixed quantity of starting alloy particles, and the aqueous amine composition is allowed to accumulate in the vessel during the activation operation.

Examples of suitable primary amines include methylamine, ethylamine, ethanolamine, and the like. Examples of suitable secondary amines include diethylamine, dimethylamine, diethanolamine, methyl ethyl amine, methyl ethanol amine, and the like. Examples of suitable tertiary amines include trimethylamine, triethylamine, triethanalamine, monomethyl diethylamine, dimethyl monoethanolamine, and the like. Examples of suitable quaternary ammonium compounds include tetra methyl ammonium hydroxide, tetraethyl ammonium hydroxide, methyl triethyl ammonium hydroxide, trimethyl monoethyl ammonium hydroxide, metal ethyl n-propyl n-butyl ammonium hydroxide, mono methanol tri ethyl ammonium hydroxide, tetramethanol ammonium hydroxide, tetra ethanol ammonium hydroxide, and the like. Various condensates of ethylene oxide, propylene oxide and/or butylene oxide with primary, secondary and tertiary amines can be employed. In general, commercially available materials are preferred for reasons of availability and cost. Mixtures of amine bases may be employed, such as a mixture of from about 25:75 to 75:25 weight ratio of tertiary (lower alkyl amine with tetra (lower alkyl) ammonium hydroxide.

Further examples of monoamines include: alpha-naphthylamine; beta-naphthylamine; m-anisidine; o-toluidine; o-anisidine; aniline; N-methyl-o-toluidine; m-toluidine; N-methylaniline; N-methyl-m-toluidine; p-toluidine; pyridine; n-dimethylaniline; p-anisidine; n-methyl-p-toluidine; beta-picolene; n-dimethyl-o-toluidine; alpha-picolene; gamma-picolene; triethanolamine; tris (hydroxyethehyl) methylamine; morpholene; diethanolamine; 2-methoxy ethylamine; ethanolamine; benzylamine; I-propyl piperidine; I-2 dimethyl piperidine; I-ethyl piperidine; isobutyl amine; I-butyl piperidine; propylamine; iso-amylamine; n-butyl amine; iso-propylamine; cyclohexylamine; methylamine; ethylamine; triethylamine; dimethylamine; diethylamine; and piperidine.

Further examples of diamines include: penta methylene diamine; tetra methylene diamine; trimethylene diamine; ethyl ethylene diamine; N-N' diethyl ethylene diamine; methyl ethylene diamine; N-N' dimethyl ethylene diamine; ethylene diamine N-N diethyl ethylene diamine; hydroxyethyl ethylene diamine; piperazine; I-2 diamino propane; I-3 diamino 2 propanol and N-N dimethyl ethylene diamine.

Examples of polyamines include: diethylene triamine; I-2-3 triamino propane and triethylene tetramine.

During the second contacting step, there is preferably but optionally present in the second contacting solution an additive. The quantity of additive present can vary greatly, from greater than 0 up to about 30 weight percent (total second solution basis) being the broad range but quantities from about 0.01 to 5 weight percent being preferred. The additive is preferably either a hydroxyl-containing hydrocarbon compound or an amino carboxylic acid.

The hydroxylated hydrocarbon compound can be characterized by having at least two carbon atoms per molecule and by having at least two carbon atoms per molecule and by having at least two groups per molecule, each of which is independently selected from the class consisting hydroxyl, carboxyl, aldehyde, alkali metal carboxylate, and carboxylate esterified with a lower aliphatic alcohol. At least one of such groups is hydroxyl. Preferably, such a hydroxylated hydrocarbon compound has at least three carbon atoms per molecule, and at least three groups per molecule, each of which independently selected from the class consisting of hydroxyl, carboxyl, aldehyde, alkali metal carboxylate, and lower alkyl carboxylate, at least one of said groups being hydroxyl. The hydroxylated hydrocarbon compound, in any given instance, may be aliphatic, aromatic, heterocyclic (in which event the heterocyclic ring contains at least one oxygen atom in its structure), or the like. Such hydroxylated hydrocarbon compound may be in a single compound or a polymer such as, for instance, a polymer of the polyolefin oxide condensate type; for example, a polyethylene oxide/polypropylene oxide condensate of the general chemical structure:

$$HO(C_2H_4O)_a (C_3H_6O)_b (C_2H_4O) H$$

where $a$ and $b$ are each integers which can vary widely so long as a resulting molecule is water soluble or water dispersible, one convenient range for each of $a$ and $b$ being in the range of from between three and twelve inclusive.

The amino carboxylic acid additives suitable for use in this invention can be characterized as hydrocarbon compounds containing from about 3 to 25 carbon atoms per molecule and further containing at least one nitrogen atom per molecule and at least one carboxyl group per molecule, the carboxyl group either being in the form of a carboxylic acid or in the form of an alkali metal salt or ammonium salt. Aliphatic, aromatic, and heterocyclic (in which the heterocyclic ring contains at least one nitrogen atom), alicyclic and other classes of hydrocarbon compounds may form the backbone of the amino carboxylic acid in any given instance.

Examples of suitable amino carboxylic acids include amino polycarboxylic acids containing more than one carboxylic acid group in an alpha position relative to the nitrogen atom (such as the material known as EDTA), nitrilo triacetic acid, amino triacetic acid, diethylene triamine penta acetic acid (and its sodium salts), 1,2-diamino cyclohexane tetraacetic acid, derivatives of EDTA and amino triacetic acid, such as hydroxyethyl-amino-diacetic acid, dihydroxyethyl-amino-acetic acid, hydroxyethyl-ethylene-diamine-triacetic acid, dihydroxyethyl-ethylene-diamine-diacetic acid, ethylene-diamine-di(ortho-hydroxy-phenylacetic acid), disalicyladehyde ethylene diamine, versene(the sodium salt of EDTA), glutamic acid, serine, cystine, cysteine, dl-dopa (3,5-dihydroxy phenylalanine), hydroxylysine, glutamine, asparagine, and the like.

One preferred group of hydroxylated hydrocarbon compounds suitable for use in the present invention comprises polyhydroxylated aliphatic carboxylic acids. One class of such acids suitable for use in the present invention is characterized by the formula:

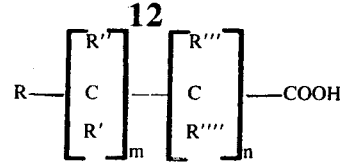

where:
R, R', R'', R''' and R'''' are each independently H, lower alkyl, —OH, or —COOH provided that at least one of R, R', R'', R''' and R''41 is hydroxyl and that at least one other of such R, R', R'', R''' and R'''' groups is either carboxyl or hydroxyl, $n$ is an integer of from 2 through 8 (4 through 8 being preferred), $m$ is an integer of from 0 through 4.

It will be readily appreciated by those skilled in the art that one can employ, in place of, or in addition to, those compounds of formula (1), carboxylate salts (such as alkali metal salts and ammonium salts) and carboxylate esters (such as lactones and esters with lower aliphatic alcohols) which will, in alkaline water solution, form the same anions as do the compounds of formula (1).

Examples of particular compounds within the scope of formula (1) include: gluconic acid, glucaric acid, saccharinic acid, and the like.

One more preferred class of hydroxylated hydrocarbon compounds within the scope of formula (1) above is characterized by the formula:

(2) R—(CHOH)$_n$—COOH

R is selected from the group consisting of —CH$_3$, —CH$_2$OH, —COOH, —CHO, and —H, and $n$ is an integer of from 1 through 5.

Examples of particular compounds within the scope of formula (2) include gluconic acid, glucaric acid, tartaric acid, d-glucuronic acid, and the like.

Examples of compounds suitable for use as additives during contacting in accord with the teachings of this invention which are similar to compounds within the scope of formula (1) or formula (2) include alkali metal salts (sodium being presently preferred) of gluconic acid, tartaric acid, or citric acid, lactones, such as glucono-S-lactone, and the like.

Another class of hydroxylated hydrocarbon compounds includes aliphatic polyhydroxylated compounds with at least three carbon atoms and at least three hydroxyl groups per molecule. Such compounds can include as many as 12 to 15 carbon atoms in a given molecule. Examples include pentaerythritol, glycerol, and the like.

A more preferred class of such polyhydroxylated hydrocarbon compounds suitable for use with caustic in activating Raney copper catalysts for use in the practice of the present invention is characterized by the formula:

(3) H—(CHOH)$_n$ — CH$_2$OH where $n$ is an integer of from 3 through 8.

Examples of formula (3) compounds include sorbitol, mannitol, and the like.

Another class of hydroxylated hydrocarbon compounds suitable for use in the practice of the present invention for activating Raney copper catalysts with caustic includes saccharides (including moni, di, and polysaccharides). Examples include glucose, sucrose, corn starch, arabinose, and the like.

One preferred class of hydroxylated hydrocarbon compounds comprises aromatic compounds containing at least two hydroxyl groups (preferably ring bonded)

and one aromatic ring. A carboxyl or aldehyde group may be present. One preferred example is gallic acid.

Preferred hydroxylated hydrocarbon compounds are substantially completely water soluble at the concentrations employed in the usual practice of this invention.

Presently most preferred hydroxylated hydrocarbon compounds include gluconic acid (and compounds which produce the gluconate ion in water solution, such as sodium gluconate, glucono-delta-lactone, and the like) sorbitol, and glucose (dextrose).

The additive compound may be present in the wash water optionally used between the preliminary acid treatment of alloy particles and the second treatment of the acid-treated particles with a second treating solution as herein above described. Mixtures of different additives may be employed as can mixtures of different bases (alkali metal hydroxide, ammonium hydroxide, aliphatic amine and/or quaternary ammonium hydroxide).

After a second contacting operation is completed, the resulting particles are preferably washed with water (preferably distilled or deionized) having a pH ranging from about 5.5 to 7.5 for a time sufficient to (a) cause the wash water to have a pH ranging from about 7.5 to 5.5 after contact with the product particles and (b) sufficient to remove from such product particles any non-metallic visible solids (e.g., precipitated material). When continuous circulation using continuously supplied fresh water is utilized during a second contacting operation, no post washing operation is needed or desirable. In a more preferred washing operation, the product particles are washed with distilled or deionized water, having dissolved therein an additive such as is herein above described. Any conventional washing procedure may be employed, as those skilled in the art will appreciate.

The resulting group of particles comprises a catalyst of the present invention. Such particles are preferably optionally interveningly stored before being used for catalysis. When stored the particles may be conveniently kept under water (preferably deionized or distilled) using drums or the like. Keeping the catalyst under water prevents oxidation by air which occurs rapidly and undesirably is the catalyst is allowed to have oxygen exposure.

When the catalyst as above prepared is used for the hydrolysis of an olefinic nitrile to the corresponding amide, the olefinic nitrile employed preferably contains from 3 to 6 carbon atoms per molecule. A most preferred olefinic nitrile is acrylonitrile; methacrylonitrile, ethacrylonitrile and similar nitriles may be employed.

The hydrolysis reaction of this invention proceeds even when the amount of the catalyst employed is very slight. For example, addition of a catalyst as taught by this invention in an amount from about 0.1 gram per mole of acrylonitrile is sufficient to make the reaction proceed. The greater the amount of catalyst used, the faster the reaction proceeds, in general, thus permitting an increase in the amount of acrylamide produced. Consequently the amount of catalyst employed per mole of acrylonitrile initially employed can preferably range from about 0.01 to 100 grams, although more or less catalyst can be used, if desired.

Acrylamide may be made from a mixture of acrylonitrile and water, as can other amides from their corresponding nitriles when admixed with water in accordance with the teachings of the present invention using a suspension bed or a fixed bed of such catalysts. Combinations thereof may be employed. Two or more reactors may be connected in series, and the reactant liquid and the catalyst may be counter currently moved relative to each other to effect and enhance reaction.

The hydrolysis process may be practiced under atmospheric conditions but superatmospheric and subatmospheric pressures may be employed also. Batch processing may be used but continuous is preferred.

With the hydrolysis process of the present invention using a copper catalyst prepared as described herein and utilizing a suspension bed system, it is preferred to employ the catalyst in the form of particles at least 98 percent of which are in an average size range of from about 0.002 to 0.1 inch. Similarly, when the present invention is practiced using a Raney copper catalyst in the form of a fixed bed system, it is preferred and convenient to use the catalyst in the form of particles at least 98 percent of which range in average size from about 0.02 to 0.5 inch.

Those skilled in the art will appreciate that a catalyst prepared as taught herein may be subjected to further preparation by procedures known to the prior art, if desired, and before being utilized in the hydrolysis process as taught herein.

EMBODIMENTS

The present invention is further illustrated by reference to the following Examples. Those skilled in the art will appreciate that other and further embodiments are obvious and within the spirit and scope of this invention from the teachings of these present Examples taken with the accompanying specification.

EXAMPLE 1

84 grams of 50:50 weight ratio copper/aluminum alloy in the form of particles of 6 to 8 mesh size are contacted with about 600 grams total of a 25 weight percent aqueous solution of sulphuric acid in deionized water over a 24-hour period in a flask whose contents are maintained at about 60°C. Initially the particles are covered by deionized water (about 500 ml) in the flask. The acid solution is introduced into the flask and mixed with the water previously there. Hydrogen gas is evolved. The resulting particles are washed with fresh deionized water until the resulting pH is about 5.5.

The catalyst, when analyzed, is found to contain about 74 weight percent copper and about 26 weight percent aluminum.

EXAMPLE 2

A portion of the catalyst prepared as described in Example 1 and having a particle size of 6 to 8 mesh is charged to a stainless stell two-liter autoclave with 880 grams of water 420 grams of acylonitrile. Sufficient catalyst is charged so as to provide about a 10 percent catalyst loading based on acrylonitrile. The autoclave contents are heated to about 100° to 105°C and the contents are agitatated. After 5½ hours a conversion of acrylonitrile to acrylamide of about 10 percent is obtained. The low yield of acrylamide thus obtained illustrates that the catalyst of Example 1 is not a useful hydrolysis catalyst for purposes of converting acrylonitrile to acrylamide.

EXAMPLE 3

The procedure of Example 1 is repeated. The resulting material is then allowed to stand under deionized water at room temperature for 3 days. During this period, mild hydrogen evolution is noted.

EXAMPLE 4

The procedure of Example 2 is repeated using the catalyst prepared in Example 3. After 5 hours it is found that this catalyst gave a 60 percent conversion of acrylonitrile to acrylamide. Before use the catalyst is washed with fresh deionized water.

EXAMPLE 5

The procedure of Example 1 is repeated. The product material is exposed to water at 105°C for 3 hours under autogenous pressure. The product is washed with fresh deionized water.

EXAMPLE 6

The procedure of Example 2 is repeated using the freshly prepared catalyst of Example 5. After 5 hours it is found that this catalyst is a 50 percent conversion of acrylonitrile to acrylamide.

EXAMPLE 7

The procedure of Example 1 is repeated. The product material is immersed in about 600 ml of 5 weight percent aqueous solution of sodium bicarbonate and the mixture is allowed to stand at room temperature for about 24 hours. Thereafter the resulting material is washed with deionized water.

EXAMPLE 8

The procedure of Example 2 is repeated using the freshly prepared catalyst material of Example 7. A conversion of acrylonitrile to acylamide of aboud 65 percent is found after 5 hours.

EXAMPLE 9

The procedure of Example 1 is repeated. The product material is then exposed to a 5 weight percent solution of sodium hydroxide in deionized water. This sodium hydroxide solution is gradually added to the particles under initially about 500 ml of deionized water over a period of about 24 hours, during which the temperature of the system is maintained below about 30°C. Thereafter the so-treated product is washed with deionized water until the product wash water has a pH of about 7.5 About 1200 ml of such NaOH solution are used.

EXAMPLE 10

The prucudure of Example 2 is repeated using the freshly prepared catalyst of Example 9. A conversion of acrylonitrile to acrylamide of about 65 percent is observed after about 1½ hours.

EXAMPLE 11

The procedure of Example 1 is repeated. The product matarial is contacted with 500 grams total of a 25 weight percent aqueous solution of trimethylamine in deionized water over a 48-hour period in a flask. Before being contacted with the trimethylamine solution, the acid-treated particles are initially covered by about 500 ml of deionized water. The trimethylamine solution is introduced into the flask gradually at a rate such that the temperature of the agitated liquid reaction medium does not exceed about 40°C. Hydrogen gas is evolved.

The resulting particles are washed with fresh deionized water until the resulting pH thereof is about 7.5

EXAMPLE 12

The procedure of Example 11 is repeated using the catalyst of Example 11. A conversion of about 65% acrylonitrile to acrylamide is achieved in about 4½ hours.

EXAMPLE 13

The procedure of Example 11 is repeated, except that here following acid treatment and before contacting with trimethylamine the particles are initially covered by deionized water (about 500 ml) containing dissolved therein about 0.1 weight percent gluconic acid which solution remains in the flask throughout the trimethylamine contacting procedure.

We claim:

1. A process for making a copper catalyst comprising the steps of
   a. firstly contacting particles of a metal alloy comprised of copper and aluminum in a weight ratio from about 70:30 to 30:70 copper to aluminum, said particles ranging in size from about 0.001 to 0.5 inch, with an aqueous solution which has dissolved therin on a one hundred weight percent total by-product free solution basis from greater than 0 to about 50 weight percent of at least one mineral acid selected from the group consisting of sulphuric acid and hydrochloric acid for a time sufficient to remove from said particles at least about 5 weight percent of the aluminum initially present therein,
   b. secondly contacting the so acid-treated particles with an aqueous solution which has dissolved therein on a 100 weight percent total by-product free solution basis from greater than 0 to about 50 weight percent of at least one base selected from the group consisting of alkali metal hydroxide, ammonium hydroxide, aliphatic amine, quaternary ammonium hydroxide, alkali metal carbonate and water having a pH ranging from about 5.5 to 7.5 for a time sufficient to remove from said so acid-treated particles at least about one weight percent aluminum, based on total weight of aluminum initially present in said particles.

2. The process of claim 1 wherein said first contacting and said second contacting are each conducted at a temperature below about 75°C.

3. The process of claim 1 wherein, during said second contacting, said aqueous solution is brought into contact with such particles gradually over a period of time ranging from about 2 to 72 hours.

4. A process for hydrolyzing an olefinic nitrile contaning from 3 through 6 carbon atoms per molecule to the corresponding amide comprising the steps of
   a. firstly contacting particles of a metal alloy comprised of copper and aluminum in a weight ratio from about 70:30 to 30:70 copper to aluminum, said particles ranging in size from about 0.001 to 0.5 inch, with an aqueous solution which has dissolved therein on a one hundred weight percent total byproduct free solution basis from greater than 0 to about 50 weight percent of at least one mineral acid selected from the group consisting of sulphuric acid and hydrochloric acid for a time sufficient to remove from said particles at least about 5 weight percent of the aluminum initially present therein, b. secondly contacting the so acid-treated particles with an aqueous solution which has dissolved therein on a one hundred weight percent total by-product free solution basis from greater than 0 to about 50 weight percent of at least one base selected from the group consisting of alkali metal hydroxide, ammonium hydroxide, aliphatic amine, quaternary ammonium hydroxide, alkali metal carbonate and water having a pH ranging from about 5.5 to to 7.5 for a time sufficient to remove from said so acid-treated particles at least about one weight percent aluminum, based on total weight of aluminum initially present in said particles, c. washing the resulting product particles with water having a pH ranging from about 5.5 to 7.5 for a time at least sufficient to cause said wash water to have a pH ranging from about 5.5 to 7.5 and sufficient to remove from such product particles any non-metallic visible solids, d. thirdly contacting the so-washed particles with a composition comprising from about 10 to 75 weight percent acrylonitrile with the remainder up to one hundred weight percent thereof being water at a temperature ranging from about 60° to 150°C for a time sufficient to convert at least some of said olefinic nitrile to the corresponding amide.

5. The catalyst prepared by the process of claim 1.

6. The process of claim 1 wherein said second contacting is carried out using an aqueous solution which additionally has dissolved therein on a 100 weight percent total solution basis from greater than 0 to about 25 weight percent of a water soluble material selected from the group consisting of hydroxylated hydrocarbon compounds and aminocarboxylic acid compounds, each of said hydroxylated hydrocarbon compounds having from 2 to 15 carbon atoms per molecule and having at least two groups per molecule, at least one of said groups being hydroxyl, the other of said groups being selected from the class consisting of hydroxyl, carboxyl, aldehyde, alkali metal carboxylate, and esterified carboxylate, and each of said aminocarboxylic acid compounds containing from 3 to 25 carbon atoms per molecule, at least one nitrogen atom per molecule, and at least one carboxyl group per molecule.

7. The catalyst of claim 5 comprised of from about 2 to 45 weight percent aluminum with the balance up to 100 weight percent thereof being copper.

8. The process of claim 4 wherein said olefinic nitrile is acrylonitrile and the corresponding amide made therefrom by hydrolysis in such process is acrylamide.

9. The process of claim 4 wherein said second contacting is carried out using an aqueous solution which additionally has dissolved therein on a 100 weight percent total solution basis from greater that 0 to about 25 weight percent of a water solutble material selected from the group consisting of hydroxylated hydrocarbon compounds and aminocarboxylic acid compounds each of said hydroxylated hydrocarbon compounds having from 2 to 15 carbon atoms per molecule and having at least two groups per molecule, at least one of said groups being hydroxyl, the other of said groups being selected from the class consisting of hydroxyl, carboxyl, aldehyde, alkali metal carboxylate, and esterified carboxylate, and each of said aminocarboxylic acid compounds containing from 3 to 25 carbon atoms per molecule, at least one nitrogen atom per molecular, and at least one carboxyl group per molecule.

* * * * *